March 2, 1943.  A. HAHN  2,312,406
WEIGHING MACHINE
Filed March 6, 1939  2 Sheets-Sheet 1

Inventor:
Arthur Hahn
By: Mason & Porter
Attorneys

March 2, 1943.　　　A. HAHN　　　2,312,406
WEIGHING MACHINE
Filed March 6, 1939　　　2 Sheets-Sheet 2
FIG.4.　　FIG.5.
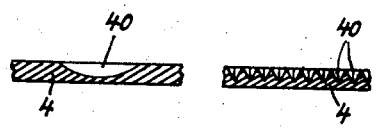
FIG.3.
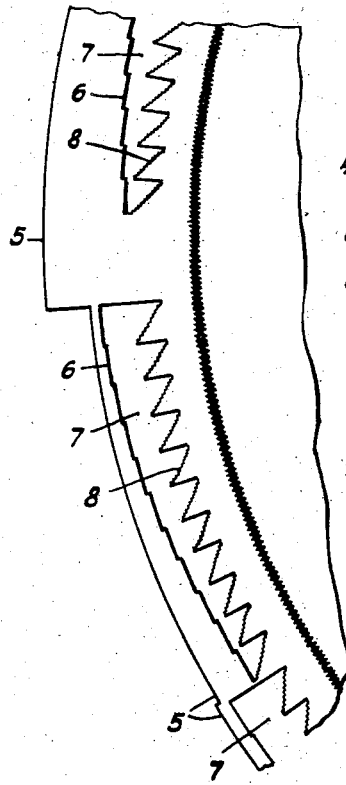
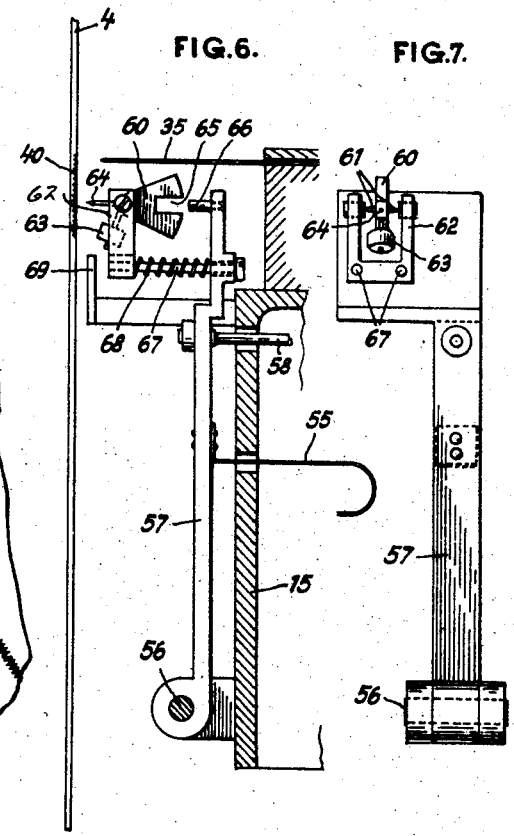
Inventor:
Arthur Hahn
By: Mason & Porter
Attorneys Patented Mar. 2, 1943

2,312,406

UNITED STATES PATENT OFFICE 2,312,406

WEIGHING MACHINE

Arthur Hahn, Balingen, Germany; vested in the Alien Property Custodian

Application March 6, 1939, Serial No. 260,242
In Germany September 23, 1938

8 Claims. (Cl. 234—5.4)

The invention relates to weighing machines having printing devices and, in particular, to weighing machines in which devices sub-divided or arranged according to various denominations are provided in a member moved by the weighing machine, these devices co-operating with feelers or the like adapted to adjust type wheels.

The object of the invention is to prevent false weighings from being effected by the weight being taken before the balance system has come to rest or swings within the limits of graduation error.

Figure 1:
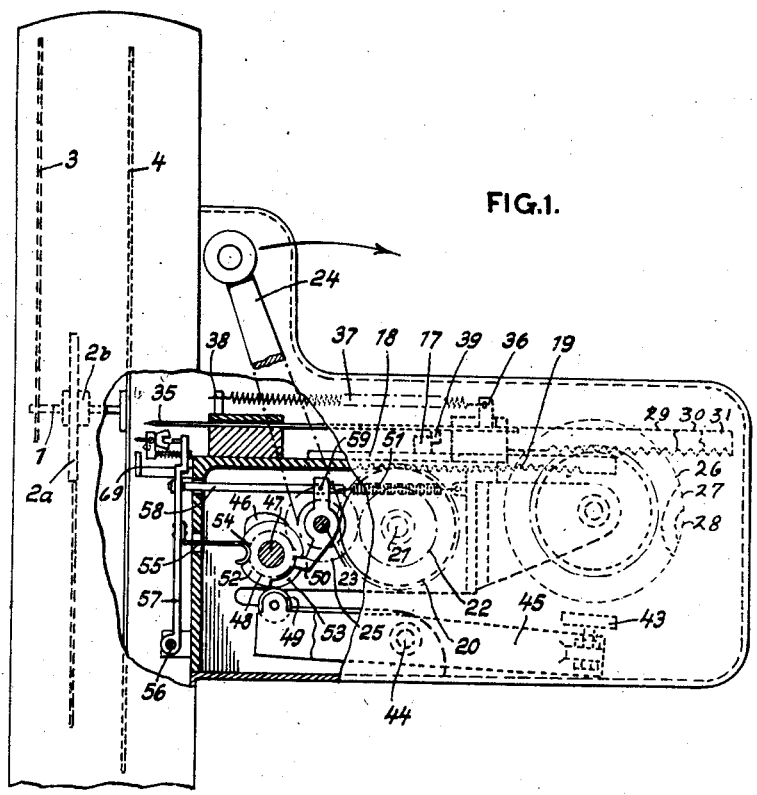
Figure 2:
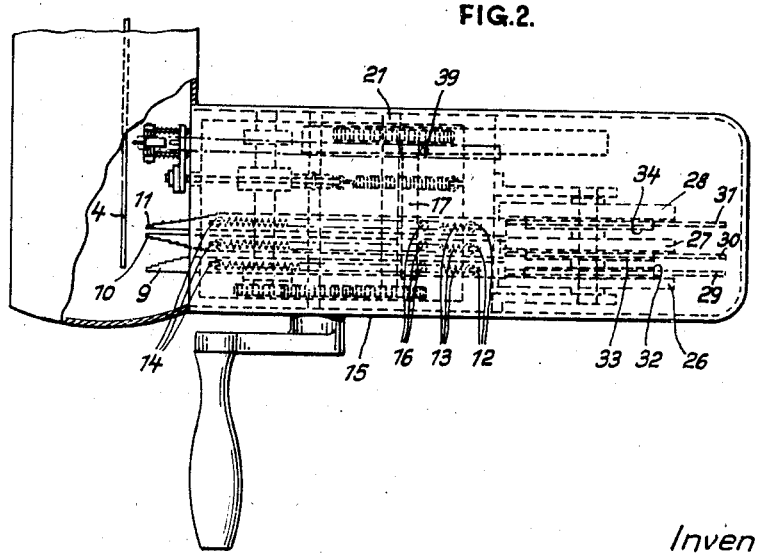

An embodiment of the invention is illustrated by way of example in the accompanying drawings in which:

Figure 1 is a side elevation,

Figure 2 is a plan view of the measuring head of a weighing machine provided with a printing device according to the invention, the device carrier being in the form of a disc, Figure 3 is an elevation of part of the disc, Figures 4 and 5 show the shape of the arresting grooves of the device carrier, Figure 6 is a side elevation and Figure 7 a front elevation of the exploring member for controlling the locking of the printing mechanism.

On the axle 1 of the weighing machine, which system is known per se and is therefore not illustrated in detail, is rigidly mounted a pointer 3 movable over a scale and the disc 4 bearing devices to be explored. The axle of the pointer is moved by the lever mechanism of the weighing machine through the medium of a rack 2a and a pinion 2b. The disc 4 is provided with devices to be explored, in a manner likewise known per se. In the embodiment illustrated by way of example the disc has devices for hundreds, tens and units. The devices for the hundreds consists of steps 5 constructed at the periphery of the disc. The devices for the tens are formed by the step-wise offset outer edges 6 of a number of recesses 7 of the disc corresponding to the hundreds devices, and the unit devices are formed by the step-wise offset inner edges 8 of these recesses.

The exploration of the devices 5, 6, 3 is effected in the axial direction of the disc 4 by three stepwise offset feelers 9, 10 and 11 (Figure 2). The feeler 9 serves for exploring the hundreds devices, the feeler 10 for exploring the tens devices, and the feeler 11 for exploring the unit devices. The feelers each carry at their rear ends an eye 12 to which one end of a spring 13 is secured, the other ends of which springs engage eyes 14 of the fixed frame 15 of the printing device and which tend to draw the feelers towards the disc 4.

Each feeler carries on its underside a projection 16. The projections 16 abut against a transverse rod 17 of a slide 18 movable in the frame 15 in the direction of the exploring movement. The slide is constructed on its underside as a rack 19, which is in engagement with a gear wheel 20. The gear wheel 20 is mounted on the axle 21, which carries a second gear wheel 22 which is in engagement with a gear wheel 25 mounted on the shaft 23 of the hand crank 24. If the hand crank is rotated in the direction of the arrow (Figure 1), then the gear wheel 20 moves the slide 18 and therewith the transverse rod 17 in the direction of the disc 4, so that the feelers 9, 10, 11 are released and likewise move towards the disc under the influence of the springs 13 and can explore the devices 5, 6, 8 located before them at the time.

The feelers 9, 10, 11 transmit their exploring movement directly to type wheels 26, 27, 28. For this purpose the feelers are constructed at their rear ends as racks 29, 30, 31 which are in engagement with gear wheels 32, 33, 34 mounted on the shafts of the type wheels. The printing type wheels are displaced in accordance with the magnitude of the exploring movements of the feelers 9, 10, 11, which move in the direction of the disc 4 until one of their steps strikes against a step on the exploring disc.

The exploration of the disc 4 by the stepped feelers 9, 10, 11 is preferably effected only after the disc has been arrested. This arresting of the disc is effected by an arresting finger 35 which is displaceably mounted in the frame 15 of the printing device. The arresting finger carries at its rear end an eye 36 with which the one end of a spring 37 engages, the other end of which is anchored at 38 to the frame 15 of the printing device. The spring tends to draw the arresting finger towards the disc 4. The arresting finger carries on its underside a projection 39, which abuts against a transverse rod 17 of the slide 18. Upon rotation of the hand crank 24 in the direction of the arrow (Figure 1) the slide 18, and therewith the transverse rod 17, is moved in the direction of the disc in the above described manner, and therewith the stepped feelers 9, 10, 11 are released as well as the arresting finger 35, which moves towards the disc 4 under the influence of the spring 37. The arrangement is such that the arresting finger precedes the stepped feelers, so that the disc 4 is brought to rest before the stepped feelers explore the devices of the disc. For holding the disc 4 fixed by the arresting finger 35, which is preferably of laminal form, grooves 40 are provided in the disc, which grooves preferably have the cross-sectional shape shown in Figures 4 and 5 and are produced by milling.

After adjustment of the printing type wheels 26, 27, 28 is effected, printing is effected by pressing a piece of paper or the like lying on the printing plate 43 against the printing type wheels. The printing plate 43 is mounted on one end of a double-armed printing stirrup 45 which is rotatably mounted at 44 and which is controlled by a cam 46. This cam is mounted on a shaft 47 which carries a gear wheel 48 which is in engagement with the gear wheel 25 on the shaft 23 of the hand crank. Upon rotation of the hand crank 24 in the direction of the arrow the cam 46 presses on the end of the stirrup 45 provided with the roller 49, and presses the printing plate 43 against the printing type wheels.

The object of the invention is to prevent the weight from being taken before the swingable weighing system with which the disc is rigidly connected has come to rest or before this system swings within the limits of graduation error. In order to achieve this, the printing device is provided with a locking device which, when an attempt is made to actuate the printing mechanism, is only released if the balance system of the weighing machine is at rest or swings within the limits of graduation error. The locking is effected by a locking pawl 50 mounted on the hand crank shaft 23 and freely rotatable thereon, this pawl being normally held in engagement with a double cam 52 mounted on the shaft 47, by a spring 51. The double cam is provided with two recesses 53 and 54. The free end of the locking pawl 50 lies in the recess 53 which extends over a certain part of the periphery of the cam. In the recess 54 lies a spring 55 which extends through an opening of the frame of the printing device and is secured to an angle feeler 57 pivoted at 56. The feeler is connected at its upper end, by a rod 58, with one end of the spring 51, the other end of which is anchored to the frame of the printing device. The rear end of the locking pawl 50 is pivoted to the rod 58 at 59.

If the hand crank 24 is rotated in the direction of the arrow, the free end of the locking pawl 50 slides along in the recess 53 of the double cam 52. At the same time the double cam presses the spring 55 out of the recess 54 and therewith swings the angle feeler 57 in the direction of the disc 4. Hereby the locking pawl 50 is moved out of the recess 53 of the double cam 52 by the rod 58, so that upon further rotation of the hand crank the cam 46 strikes the roller 49 of the stirrup 45 and printing is accomplished.

In order to prevent arrest of the weighing machine by the arresting finger 35 and the stepped feelers 9, 10, 11 and the production of a printed record, the angle feeler 57 is provided with a swinging member 60. This swinging member is mounted so as to be freely rotatable in the frame 62 by means of points 61 and is so counterweighted as at 63 that it normally takes up the position illustrated in Figure 6. The side of the swinging member turned towards the disc 4 is provided with a point 64, while the side thereof turned away from the disc has a recess 65 for the reception of the pin 66 of the angle feeler 57. The frame 62 is rigidly mounted on two guide bolts 67, which are displaceably mounted in the angle feeler 57. A spring 68 is provided around each bolt 67 and lies between the frame 62 of the swinging member 60 and the angle feeler 57. The springs 68 tend to press the pin 66 of the angle feeler 57 out of the recess 65 of the swinging member 60.

On the housing 15 of the printing device is provided a fixed stop 69 for the frame 62 of the swinging member 60. The feeler point 64 of the swinging member 60 is arranged opposite the arresting grooves 40 of the disc 4, and the stop 69 is arranged at such a distance from the disc that the point 64 is permitted to engage to a limited extent in one of the arresting grooves if the angle feeler and therewith the swinging member is moved towards the disc 4.

If, so long as the balance system of the weighing machine still swings strongly, an attempt is made to arrest the balance system by rotation of the hand crank 24, the angle feeler 57 moves in the above-described manner towards the disc 4. Hereby, since the angle feeler 57 precedes in its movement the arresting finger 35 and the step feelers 9, 10, 11 the point 64 of the swinging member 60 first abuts against the arresting grooves 40 of the still strongly oscillating disc 4, the result of which is that the point 64 is taken along by the disc 4 in one direction or the other. These swinging movements of the swinging member 60 prevent the pin 66 from engaging in the recess 65 of the swinging member because said pin can enter the recess only when the disc and the member 60 come to rest, or substantially so, with the recess in position to receive said pin. The angle feeler cannot therefore execute its full movement towards the disc, so that the locking pawl 50 is not lifted out of the recess 53 of the double cam 52 by the rod 58, but remains in engagement with the recess and prevents further rotation of the hand crank 24. This means that the arresting finger 35 is unable to engage in the arresting groove 40 of the disc 4, and the disc together with the whole swingable balance system cannot be falsely arrested. It means further, that the stepped feelers 9, 10, 11 cannot come into operation and adjust the type wheels, and finally that no printed record can be produced by means of the printing device.

If the swingable system of the weighing machine has come to rest, or if this system only swings within the limits of graduation error, the swinging member 60 takes up such a position during engagement in the arresting groove 40 of the disc that the pin 66 of the angle feeler 57 can enter the recess 65. The angle feeler can then execute its full movement in the direction of the disc, compressing the spring 68, and draw the locking pawl 50 out of the recess 53 of the double cam 52 through the intermediary of the rod 58. Thereby the driving means of the printing mechanism is released and the hand crank 24 can be further rotated, the result of which is that the disc is arrestd by the arresting finger 35, the stepped feelers explore the devices of the disc and adjust the type wheels, and printing is accomplished by the type wheels.

While one form of the invention has been shown for purposes of illustration, it is to be clearly understood that various changes in the details of construction and arrangement of parts may be made without departing from the scope of the invention as set forth in the appended claims.

I claim:

1. In a weighing machine of the type including a balance system and a printing mechanism associated therewith, the provision of driving means for the printing mechanism, a locking device engageable in the driving means for preventing untimely operation of the printing mechanism, control means for the locking device and including a feeling member engageable with the balance system of the weighing machine for preventing release of the locking device when the balance system is swinging outside the limits of graduation error but permitting release of the locking device when the balance system is at rest or is swinging within the limits of graduation error, and actuating means for the control means.

2. In a weighing machine of the type including a balance system and a printing mechanism associated therewith, the provision of driving means for the printing mechanism, a locking device engageable in the driving means for preventing untimely operation of the printing mechanism, control means for the locking device and including a feeling member engageable with the balance system of the weighing machine for preventing release of the locking device when the balance system is swinging outside the limits of graduation error but permitting release of the locking device when the balance system is at rest or is swinging within the limits of graduation error, and a single actuator for both the control means and the driving means of the printing mechanism.

3. In a weighing machine of the type including a balance system and a printing mechanism associated therewith, the provision of driving means for the printing mechanism, a locking device engageable in the driving means for preventing untimely operation of the printing mechanism, means for controlling the locking device and including a control member connected to the locking device and a feeling device engageable with the balance system of the weighing machine, said control member and said feeling device being capable of relative movement with respect to each other and said feeling device operating to prevent sufficient movement of the control member to release the locking device when the balance system is swinging outside the limits of graduation error but permitting sufficient movement of the control member to release the locking device when the balance system is at rest or is swinging within the limits of graduation error, and actuating means for the control means of the locking device.

4. In a weighing machine, as claimed in claim 3, wherein the feeling device is movable with movement of the balance system of the weighing machine independently of the control member which is interposed between the feeling device and the locking device so that movement of the control member to a position releasing the locking device is prevented by the feeling device when the balance system is swinging outside the limits of graduation error.

5. In a weighing machine, as claimed in claim 3, wherein the feeling device is shiftable toward the balance system by movement of the control member and is provided at one end thereof with a feeler point for engaging the balance system of the weighing machine and at the opposite end thereof with a recess for receiving a part of the control member to release the locking device when the balance system is at rest or is swinging within the limits of graduation error.

6. In a weighing machine, as claimed in claim 3, where a stop member is disposed in the path of movement of the feeling device for limiting movement thereof toward engagement with the balance system and wherein spring means are disposed between the feeling device and the control member for normally separating the same but permitting movement of the control member to a position releasing the locking device when the balance system is at rest or is swinging within the limits of graduation error.

7. In a weighing machine, as claimed in claim 3, wherein the locking device includes a locking pawl engageable in the driving means of the printing mechanism with limited play and wherein the control member is connected to the locking pawl.

8. In a weighing machine of the type including an explorable member and a printing mechanism associated therewith, the provision of driving means for the printing mechanism, stepped feelers adapted to cooperate with the explorable member for setting the printing mechanism at the proper weight, an arresting finger for maintaining the explorable member in equilibrium, an oscillatable finger adapted to engage the explorable member in advance of the arresting finger and the stepped feelers, a locking device engageable in the driving means for preventing untimely operation of the printing mechanism, a control member connected to said locking device and having movements thereof controlled by said exploring finger for preventing release of the locking device when the explorable member is swinging outside the limits of graduation error but permitting release of the locking device when the explorable member is at rest or is swinging within the limits of graduation error, and means under the control of said locking device for preventing movement of the stepped feelers and the arresting finger into contact with the explorable member until the locking device is released when the balance system is at rest or is swinging within the limits of graduation error.

ARTHUR HAHN.